United States Patent [19]
Evans

[11] 3,899,193

[45] Aug. 12, 1975

[54] MUD FLAP MOUNTING ASSEMBLY

[76] Inventor: James P. Evans, 3233 S.W. 23 St., Oklahoma City, Okla. 73128

[22] Filed: June 7, 1973

[21] Appl. No.: 367,979

[52] U.S. Cl. .................................. 280/154.5 R
[51] Int. Cl. ............................... B62d 25/16
[58] Field of Search ............ 280/154.5 R, 154.5 A; 160/391; 24/248 L

[56] References Cited
UNITED STATES PATENTS

| 938,057 | 10/1909 | Jay | 280/154.5 R |
| 1,015,068 | 1/1912 | Pulit | 160/391 |
| 3,219,363 | 11/1965 | Dalsey | 280/154.5 R |
| 3,684,312 | 8/1972 | Evans | 280/154.5 R |

*Primary Examiner* — Robert R. Song
*Attorney, Agent, or Firm* — Robert M. Hessin; Laney Dougherty, Hessin & Fish

[57] ABSTRACT

An improved mud flap mounting assembly secured to the underside of trucks, truck trailers or the like for suspending mud flaps behind the vehicle wheels. The assembly is constructed for the quick change of torn or worn out mud flaps and includes a front plate and a back plate secured together at one end by a hinge assembly. The upper edge of a flexible mud flap is positioned between the front and back plate. The back plate is then hingably rotated compressing the mud flap between the sides of the front and back plate. The mud flap is secured in place by a securing means at the opposite end of the plates.

2 Claims, 9 Drawing Figures

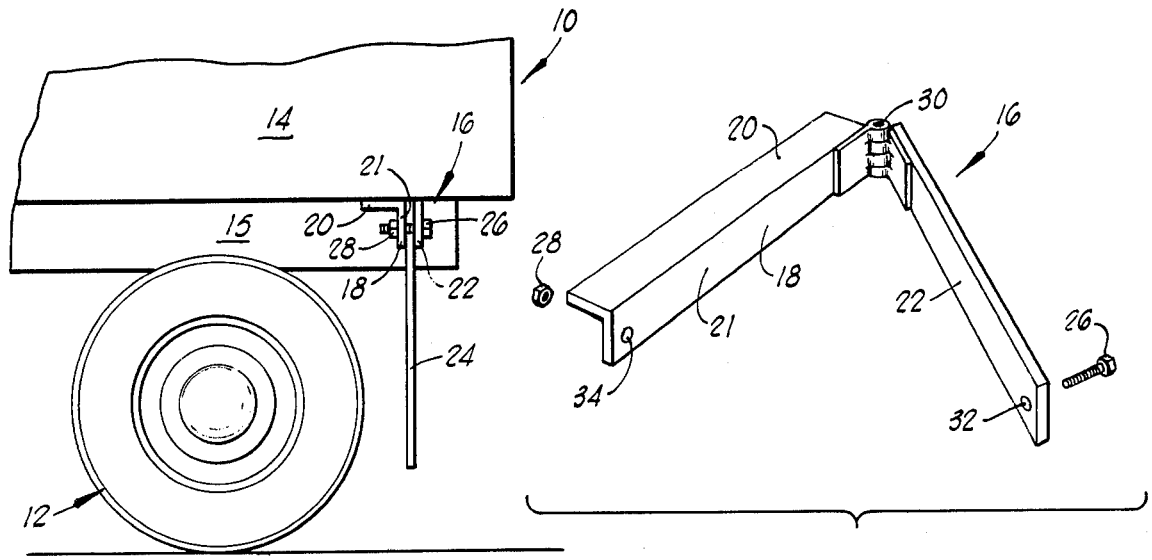
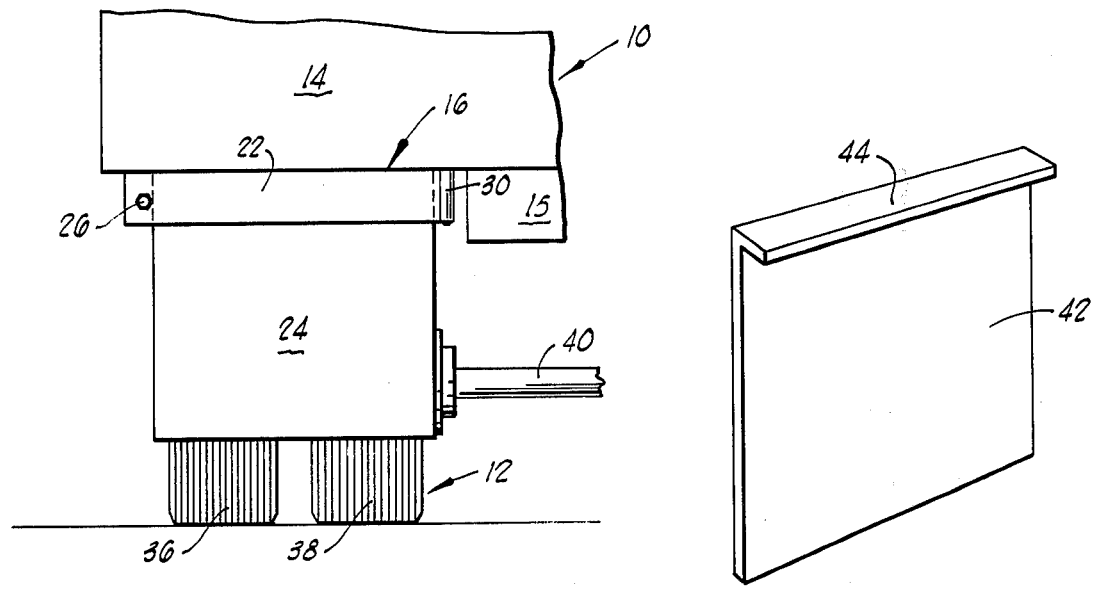

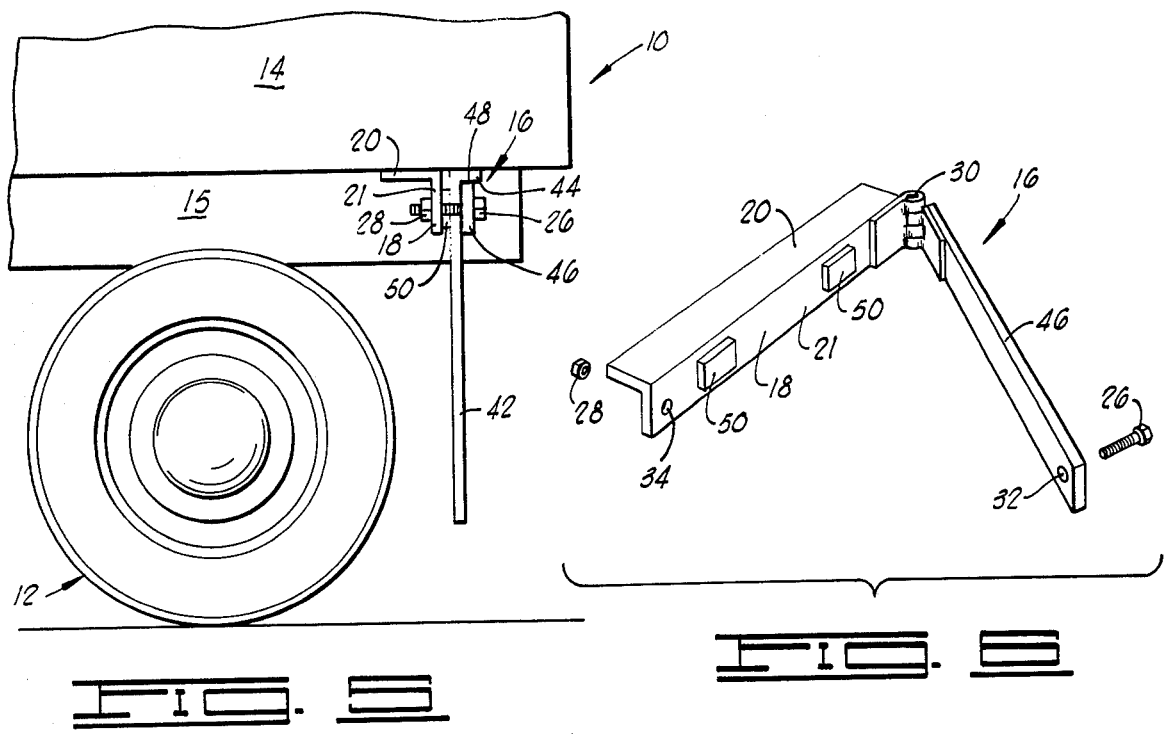
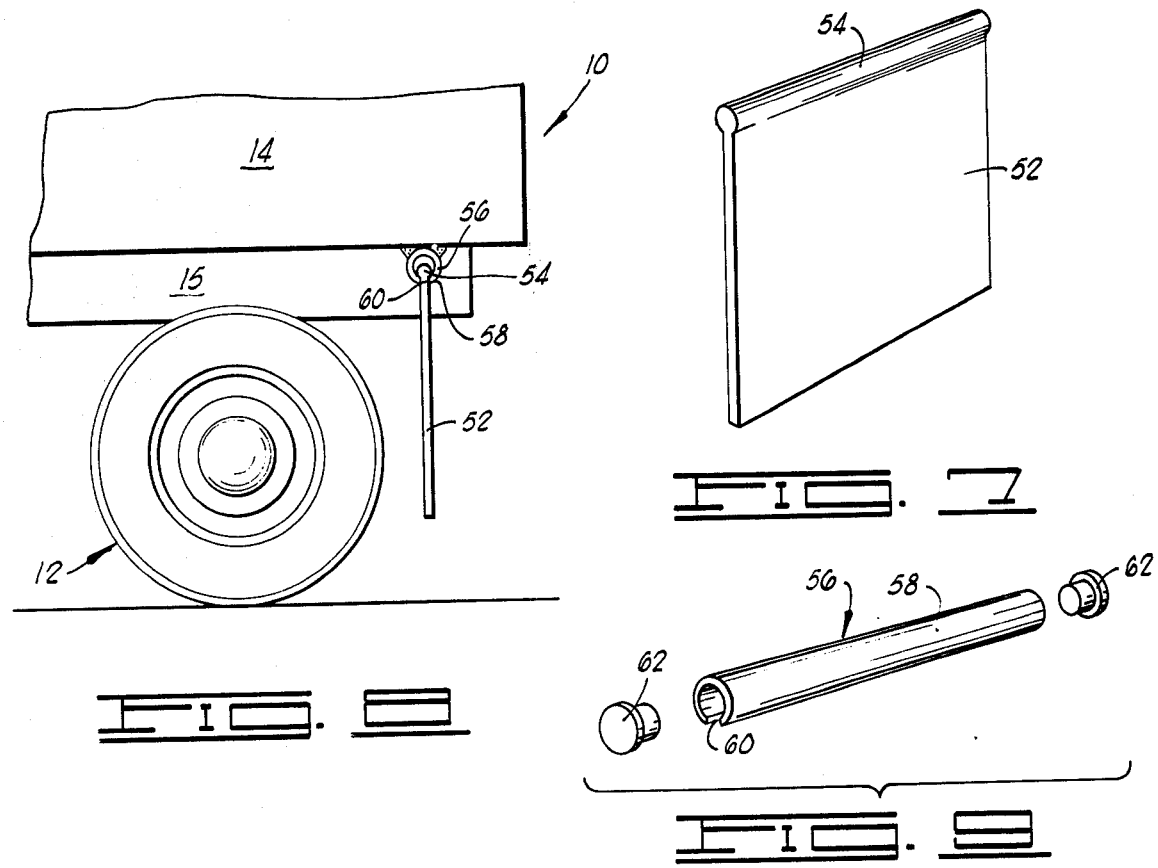

MUD FLAP MOUNTING ASSEMBLY

BACKGROUND OF THE INVENTION

1. Field of the Invention

The invention relates to mud flap mounting assemblies of the type secured to the underside of trucks, truck trailers or the like for suspending mud flaps which prevent mud, rocks or water spray from being thrown rearwardly by the wheels of the vehicle and interferring with the following traffic.

2. Brief Description of the Prior Art

A number of types of mud flap mounting assemblies have been proposed in the past. An L-shaped front plate with the upper end of the mud flap bolted to one side of the plate and the other side secured to the underside of the truck is the standard method of suspending mud flaps. A hinge type assembly that fits over a lip on the upper edge of a mud flap has been used but this assembly requires a specially made mud flap. Also, a mounting assembly for quick change of mud flaps using studs mounted on an assembly bracket and mud flaps with T-shaped openings to fit through the studs and suspended therefrom has been used but here again the assembly requires a specially made mud flap.

Also there have been various mud flap mounting assemblies and mud flap improvements related to preventing the tearing or ripping of the mud flaps when pinched between the rear tire of the vehicle and a curb. It should be mentioned that I disclosed a mud flap assembly for frictionally retaining a conventional mud flap that can be pulled free due to downward tension in my invention U.S. Pat. No. 3,684,312 issued on Aug. 15, 1972. None of the above-mentioned prior art discloses the novel features of the subject invention as to the improvement of changing torn or worn out mud flaps.

SUMMARY OF THE INVENTION

This invention relates to an improved mud flap mounting assembly secured to the underside of trucks, truck trailers or the like for suspending mud flaps behind the vehicle wheels. It is characterized by the construction of an assembly which allows quick change of torn or worn out mud flaps.

Broadly described, the mud flap mounting assembly comprises a front plate secured to the underside of the vehicle. A back plate hingably connected to the front plate at one end of the plates. A conventional mud flap with its upper edge frictionally engaged between the front and back plate and suspended therefrom, and a threaded bolt and locking nut securing the opposite end of the front and back plates and compressing the mud flap between the front and back plate.

The improved mud flap mounting assembly rather than using a hinged front and back plate may be characterized by using a tubular member with a lineal opening at the bottom of the tube and suspending a mud flap through the opening.

Also rather than using a conventional mud flap characterized by a flat rectangular surface, specially manufactured mud flaps with transverse angular or cylindrical shaped upper edges can be used in securing the mud flap to the mounting assembly.

An object of the present invention is to provide an improved mud flap mounting assembly which allows mud flaps to be replaced quickly, thus reducing time and costly labor.

Another object of the invention is to allow the person changing the mud flap to loosen a single securing device on the mounting assembly in order to remove the engaged mud flap.

A further object of the invention is the single securing device which is generally positioned near the outside of the vehicle's underside, eliminates the need to crawl under the truck body to remove the mud flap from the mud flap mounting assembly.

Still a further object of the invention is the simplicity in design and low cost in manufacturing this type of mounting assembly.

Another object of the invention is that a conventional mud flap may be used in the mounting assembly without going to the additional cost of purchasing a specially made mud flap.

Other objects and advantages of the invention will become apparent as the following detailed description of the invention is read in conjuction with the accompanying drawings which illustrate the invention.

BRIEF DESCRIPTION OF THE DRAWINGS

FIG. 1 is a side elevation of the improved mud flap mounting assembly secured to the underside of a vehicle.

FIG. 2 is a perspective view of the mud flap mounting assembly.

FIG. 3 is a rear view of the vehicle depicted in FIG. 1.

FIG. 4 is a mud flap having a transverse angular lip.

FIG. 5 is a side elevation showing an improved mud flap mounting assembly with the mud flap depicted in FIG. 4 installed.

FIG. 6 is a perspective view of an improved mud flap mounting assembly used in FIG. 5.

FIG. 7 is a mud flap having a transverse conical bead.

FIG. 8 is a side elevation showing an improved mud flap mounting assembly with the mud flap depicted in FIG. 7 installed.

FIG. 9 is a perspective view of an improved mud flap mounting assembly used in FIG. 8.

DETAILED DESCRIPTION OF THE PREFERRED EMBODIMENTS

FIG. 1 is a side elevation of truck trailer 10 having vehicle wheels 12 positioned at the rear of the truck trailer body 14 and truck trailer frame 15. The improved mud flap mounting assembly 16 being characterized by an L-shhaped front plate 18 having one side 20 secured to the underside of body 14 and the other side 21 hingably attached to one end of back plate 22. Conventional mud flap 24 is frictionally engaged between back plate 22 and front plate side 21 and secured therein by threaded bolt 26 and locking nut 28 at the opposite end of back plate 22 and front plate side 21.

FIG. 2 is a perspective view of the assembly 16 showing hinge 30 attaching one end of back plate 22 to one end of side 21 of front plate 18. FIG. 2 also shows apertures 32 and 34 for receiving bolt 26 which is threaded into nut 28 for securing mud flap 24 between front plate side 21 and back plate 22.

FIG. 3 is a rear elevation of the truck trailer 10 shown in FIG. 1. FIG. 3 illustrates the position of the improved mounting assembly 16 behind tires 36 and 38 of wheels 12 attached to axle 40. The assembly 16 from this elevation shows mud flap 24 frictionally engaged behind back plate 22 and secured by securing bolt 26 and hinge 30.

FIG. 4 illustrated a specially made mud flap 42 characterized by a transverse angular lip 44 disposed on the upper edge of the flap 42.

FIG. 5 is a side elevation of truck trailer 10 which shows the mounting assembly 16 having a back plate 46 constructed to provide an aperture 48 between the upper edge of plate 46 and the underside of truck trailer body 14 for inserting lip 44. Mounting assembly 16 is further characterized to include gripping pads 50 attached to side 21 of front plate 18.

FIG. 6 is a perspective view of the assembly 16 shown in FIG. 5 and further illustrates gripping pads 50 attached to front plate side 21 of front plate 18 and back plate 46 attached to hinge 30. Also shown is aperture 32 in back plate 46 and aperture 34 in front plate side 21 for receiving bolt 26 which is threaded into nut 28.

FIG. 7 illustrates a specially made mud flap 52 characterized by a transverse conical bead 54 disposed along the upper edge of flap 52.

FIG. 8 is a side elevation of truck trailer 10 which illustrates an improved mud flap mounting assembly 56 comprising an elongated tube 58 secured to the underside of truck body 14. Tube 58 having a lineal opening 60 for receiving mud flap 52. Bead 54 being secured against the walls of tube 58 and flap 52 suspended through opening 60.

FIG. 9 is a perspective of the improved mud flap mounting assembly 56 and further illustrates caps 62 which can be inserted into the ends of tube 58 to retain flap 52 horizontally inside tube 58.

The foregoing illustrates and describes the novel teachings with respect to improved mud flap mounting assemblies for attachment to the underside of trucks, truck trailers or the like. Employment of these teachings will greatly reduce the time and cost of labor in removing torn and worn out mud flaps. Also because of the ease in removing the mud flaps using these improved assemblies, truck operators will be encouraged to more quickly remove torn or worn out mud flaps which will aid in overall improved highway safety.

Changes may be made in combination and arrangement of the elements as heretofore set forth in the specification and shown in the drawings it being understood that the changes may be made in the embodiments disclosed without departing from the spirit or scope of the invention as defined in the following claims.

What is claimed is:

1. An improved mud flap mmounting assembly secured to the underside of trucks, truck trailers or the like and suspended behind the vehicle wheels and constructed for the quick change of mud flaps, the said assembly comprising:

an elongated angular shaped front plate with first side of said front plate secured to said vehicle;

an elongated back plate of lesser width than said front plate;

a hinge structure rotatably connecting one end of said back plate to one end of the second side of said front plate such that said back plate defines an elongated aperture between the upper side of said vehicle and the upper edge of said back plate;

a flexible mud flap having the upper edge of the planar surface of said mud flap extending between said front and back plates frictionally engaged thereby said flexible mud flap having a transverse angularly shaped lip disposed along the upper edge of the planar surface of said flap whereby said lip is disposed in said aperture; and a securing device connecting the opposite end of the second side of said front plate to the opposite end of said back plate and drawing said front and back plates toward each other and against said mud flap.

2. An improved mud flap mmounting assembly as defined in claim 1 wherein said securing device is a threaded bolt and locking nut.

* * * * *